(12) United States Patent
Katagiri et al.

(10) Patent No.: US 7,555,061 B2
(45) Date of Patent: Jun. 30, 2009

(54) OPTICAL COMMUNICATION DEVICE

(75) Inventors: Toru Katagiri, Kawasaki (JP); Takeshi Hoshida, Kawasaki (JP); Tomoo Takahara, Kawasaki (JP); Kentaro Nakamura, Kawasaki (JP); Naoki Kuwata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 609 days.

(21) Appl. No.: 11/155,666

(22) Filed: Jun. 20, 2005

(65) Prior Publication Data

US 2006/0193399 A1    Aug. 31, 2006

(30) Foreign Application Priority Data

Feb. 28, 2005   (JP) ............................. 2005-054372

(51) Int. Cl.
  *H04L 27/20*    (2006.01)
(52) U.S. Cl. .................. 375/308; 375/298; 375/300; 375/244; 375/279; 375/329; 398/188; 398/198; 398/183; 398/185; 359/279
(58) Field of Classification Search ........... 375/308, 375/298, 300, 244, 279, 283; 398/188, 198, 398/183, 185; 359/279
  See application file for complete search history.

(56) References Cited

U.S. PATENT DOCUMENTS

| 5,295,013 | A |   | 3/1994  | Ono |
|-----------|---|---|---------|-----|
| 5,369,378 | A | * | 11/1994 | Kosaka et al. ............. 332/104 |
| 6,595,707 | B1 |  | 7/2003  | Kuwata et al. |
| 2001/0043583 | A1 |  | 11/2001 | Sakoda et al. |
| 2004/0081470 | A1 |  | 4/2004  | Griffin |
| 2005/0074245 | A1 | * | 4/2005 | Griffin .................... 398/188 |

FOREIGN PATENT DOCUMENTS

| JP | 10-145854  | 5/1998  |
|----|------------|---------|
| JP | 5-268159   | 10/1999 |
| JP | 2000-165246 | 6/2000 |
| JP | 2004-516743 | 6/2004 |

OTHER PUBLICATIONS

A. H. Gnauck et al., "Spectrally Efficient (0.8 b/sHz) 1-Tb/s (25×42.7 Gb/s) RZ-DQPSK Transmission Over 28 100-km SSMF Spans With 7 Optical Add/Drops," *ECOC2006*, WX6.

(Continued)

*Primary Examiner*—Shuwang Liu
*Assistant Examiner*—Kabir A Timory
(74) *Attorney, Agent, or Firm*—Fujitsu Patent Center

(57) ABSTRACT

An optical sender is disclosed that operates in a Differential Quadrature Phase Shift Keying modulation scheme for high speed optical transmission and is capable of performing logical calculations at a low speed. The optical sender transmits a Differential Quadrature Phase Shift Keying (DQPSK) signal generated with modulation signals $\rho_k$ and $\eta_k$ so that a signal directly output from a signal receiver corresponding to the optical sender is in agreement with data signals $I_k$ and $Q_k$ to be transmitted. The signal receiver is capable of modulation by DQPSK, and the modulation signals $\rho_k$ and $\eta_k$ are precoded by using the data signals $I_k$ and $Q_k$ and the modulation signals one symbol earlier ($\rho_{k-1}$ and $\eta_{k-1}$). The optical sender includes plural precoders that perform logical calculation simultaneously and in parallel on plural data signals one period after another period.

6 Claims, 6 Drawing Sheets

OTHER PUBLICATIONS

R. A. Griffin et al., "Optical Differential Quadrature.Phase-Shift Key (DQPSK) for High Capacity Transmission," *Technical Digest of OFC2002*, WX6, pp. 367, 368.

JPO Office Action, with partial English Translation, mailed Jun. 3, 2008 in corresponding Japanese Patent Application No. 2005-054372.

* cited by examiner

OPTICAL COMMUNICATION DEVICE

BACKGROUND OF THE INVENTION

1. Field of the Invention

The present invention relates to an optical sender and a transponder capable of modulation by Differential Quadrature Phase Shift Keying, particularly, to an optical sender and a transponder used in a communication system able to send and receive optical signals at a high bit rate and modulated by Differential Quadrature Phase Shift Keying (DQPSK).

2. Description of the Related Art

In recent years and continuing, optical modulation schemes such as DPSK (Differential Phase Shift Keying) or DQPSK (Differential Quadrature Phase Shift Keying) are attracting attention as techniques allowing optical transmission at a bit rate higher than 40 Gbps.

The DQPSK modulation scheme is superior in long distance transmission, high density multiple/large capacity transmission, and in convenience of design and usage compared to other common and well-known modulation schemes such as NRZ (Non-Return-to-Zero), CS-RZ (Carrier suppressed Return-to-Zero), and RZ-DPSK (Return-to-Zero Differential Phase Shift Keying). In this specification, it is assumed that the DQPSK modulation scheme includes the RZ-DQPSK scheme for converting DQPSK signals into pulses, and the Carrier suppressed Return-to-Zero DQPSK scheme.

Below, an optical sender and an optical receiver are described briefly, which employ the DQPSK modulation scheme.

FIG. 3 is a block diagram illustrating an example of a configuration of an optical sender employing the DQPSK modulation scheme in the related art.

For details of the optical sender in FIG. 3, reference can be made to International Application's Japanese Publication No. 2004-516743, and A. H. Gnauck et al., "Spectrally Efficient (0.8 b/s/Hz) 1-Tb/s (25×42.7 Gb/s) RZ-DQPSK Transmission Over 28 100-km SSMF Spans With 7 Optical Add/Drops", ECOC2004, PD.4.4.1.

In the optical sender shown in FIG. 3, a light source 3-1, for example, a DFB (Distributed Feedback Laser) emits a light beam, and the light beam is split into two beams. One of the two split light beams enters into a first phase modulator (PM) 3-2, and the other split light beam enters into a second phase modulator (PM) 3-3 and a phase shifter 3-4.

The phase modulators 3-2 and 3-3, being independently driven by respective modulation signals $\rho_k$ and $\eta_k$ generated in a precoder 3-5 from data signals $I_k$ and $Q_k$, selectively change phases of the respective incident light beams by 0 or $\pi$ [rad]. The phase shifter 3-4 applies a phase difference of $\pi/2$ to the incident light beam propagating in a light path through the phase modulator 3-3 with respect to the incident light beam propagating in a light path through the phase modulator 3-2.

Hence, the output light beam from the light path through the phase modulator 3-2 becomes an optical signal modulated by shifting the phase of the light from the light source 3-1 by 0 or $\pi$. On the other hand, the output light beam from the light path through the phase modulator 3-3 becomes an optical signal modulated by shifting the phase of the light from the light source 3-1 by $\pi/2$ or $3\pi/2$. By combining the output light beams from the light paths, DQPSK optical signals are generated whose phases have four different possible values of $\pi/4$, $3\pi/4$, $5\pi/4$, and $7\pi/4$.

Because the bit rate of these DQPSK optical signals is twice the bit rate of the data signals $I_k$ and $Q_k$ processed in the precoder 3-5, for example, in order to transmit the DQPSK optical signals at a bit rate of 40 Gbps, it is sufficient to drive the phase modulators (PM) 3-2 and 3-3 by using data signals at a bit rate of 20 Gbps.

If the above DQPSK optical signals are sent to an intensity modulator 3-6, which is driven by a clock signal synchronized with the data signal and having a duty ratio of 50%, and the intensity modulator 3-6 converts the DQPSK optical signals into pulses while performing Return-to-Zero processing, RZ-DQPSK optical signals are generated. Further, by increasing the duty ratio of the clock signal to 60%, Carrier suppressed Return-to-Zero DQPSK (CSRZ-DQPSK) optical signals are generated.

The precoder 3-5 performs calculations expressed by the following logical relations (2), which are obtained by expanding the following logical relations (1) and re-arranging the expansion results.

$$\rho_k = \overline{(I_k \oplus \overline{\rho_{k-1}})(I_k \oplus \eta_{k-1})(\rho_{k-1} \oplus \eta_{k-1}) +} \overline{(Q_k \oplus \overline{\rho_{k-1}})(Q_k \oplus \overline{\eta_{k-1}})(\rho_{k-1} \oplus \overline{\eta_{k-1}})} \quad (1)$$

$$\eta_k = \overline{(Q_k \oplus \eta_{k-1})(Q_k \oplus \rho_{k-1})(\rho_{k-1} \oplus \eta_{k-1}) +} \overline{(I_k \oplus \eta_{k-1})(I_k \oplus \overline{\rho_{k-1}})(\overline{\rho_{k-1}} \oplus \eta_{k-1})}$$

$$\rho_k = Q_k\rho_{k-1}\eta_{k-1} + I_k\rho_{k-1}\overline{\eta_{k-1}} + \overline{I_k\rho_{k-1}}\eta_{k-1} + \overline{Q_k\rho_{k-1}\eta_{k-1}} \quad (2)$$

$$\eta_k = I_k\rho_{k-1}\eta_{k-1} + \overline{Q_k\rho_{k-1}\overline{\eta_{k-1}}} + Q_k\overline{\rho_{k-1}}\eta_{k-1} + \overline{I_k\rho_{k-1}\eta_{k-1}}$$

In the above logical relations (1) and (2), $I_k$ and $Q_k$ indicate logical values (1 or 0) of signals at the timing of the k-th clock pulse input to the precoder 3-5 shown in FIG. 3, and $\rho_k$ and $\eta_k$ indicate logical values (1 or 0) of signals at the timing of the k-th clock pulse output from the precoder 3-5. Here, the subscript k−1 indicates the logical value at the timing of the preceding one clock pulse.

In order to perform the above calculations, in the optical sender shown in FIG. 3, the output signals $\rho_k$ and $\eta_k$ from the precoder 3-5 are fed back to the input terminals of the precoder 3-5 through delay elements 3-6, which generate a time delay $\tau$ corresponding to one symbol.

FIG. 4 is a circuit diagram illustrating an example of a configuration of the precoder in the related art.

In FIG. 4, logical values of $\rho_k$ and $\eta_k$ corresponding to the preceding one symbol are fed back through delay elements D which generate a time delay $\tau$.

FIG. 5 is a block diagram illustrating an example of a configuration of an optical receiver for demodulating the DQPSK optical signals in the related art.

For details of the optical receiver in FIG. 5, reference can be made to International Application's Japanese Publication No. 2004-516743.

In the optical receiver shown in FIG. 5, an input DQPSK optical signal is split into two optical signals, and the two split optical signals are input to delay interferometers 5-1 and 5-2, respectively.

In each of the delay interferometers 5-1 and 5-2, for example, a Mach-Zehnder light guide having two arms is formed on a silica substrate or an indium phosphide substrate, and path lengths of the two arms are designed to be different; thereby, a time delay $\tau$ corresponding to one symbol is generated between light propagating through the two arms.

In addition, it is set that interference occurs in the delay interferometer 5-1 at a delay of $\pi/4$, which is given by a phase shifter 5-3 arranged in one arm, and that interference occurs in the delay interferometer 5-2 at a delay of $-\pi/4$, which is given by a phase shifter 5-4 arranged in the other arm.

Two complementary output signals from a coupler at the output stage of the delay interferometer 5-1 are input to a differential receiving circuit 5-5 including a pair of optical detectors and an amplifier. The differential receiving circuit 5-5 generates an electrical signal $I_k$ by demodulating an in-phase component of the DQPSK optical signal.

Similarly, two complementary output signals from a coupler at the output stage of the delay interferometer 5-2 are input to a differential receiving circuit 5-6 including a pair of optical detectors and an amplifier. The differential receiving circuit 5-6 generates an electrical signal $Q_k$ by demodulating a quadrature component of the DQPSK optical signal.

The delay interferometer 5-1 or 5-2 used in the optical receiver shown in FIG. 5 may be constructed by a light guide as described above. In addition, the delay interferometer may also be constructed, for example, by combinations of fiber fusion couplers.

Further, when demodulating optical signals by FSK (Frequency Shift Keying) or PSK (Phase Shift Keying) modulation schemes, a Mach-Zehnder type delay interferometer can be constructed by utilizing a time difference of propagation delays between two intrinsic axes of a polarization-maintaining fiber. For example, such a delay interferometer is disclosed in Japanese Laid Open Patent Application No. 5-268159.

The signals input to the optical receiver are DQPSK optical signals obtained by phase modulation according to the aforesaid modulation signals $\rho_k$ and $\eta_k$, and the electrical signals output from the optical receiver are the data signals $I_k$ and $Q_k$ before the precoder 3-5. Namely, the precoder 3-5 transmits DQPSK signals generated with modulation signals $\rho_k$ and $\eta_k$ obtained by performing calculations of the logical relations (2) on data signals $I_k$ and $Q_k$ which are to be transmitted, so that the electrical signals directly output from the DQPSK optical receiver are in agreement with the data signals $I_k$ and $Q_k$ to be transmitted.

Such a precoder is described in R. A. Griffin and A. C. Carter, "Optical Differential Quadrature Phase-Shift Key (DQPSK) for High Capacity Transmission", Technical Digest of OFC2002, WX6.

FIG. 6 is block diagram illustrating an example of a DQPSK transponder using the above optical sender and the above optical receiver.

Shown in FIG. 6 is an example of a transponder operating at a bit rate of about 40 Gbps.

In FIG. 6, the left side is a client (user), and the right side is a network for WDM (Wavelength Division Multiplexing) transmission.

In the transponder shown in FIG. 6, data signals from the client (user) side are transmitted through an optical fiber and are received by an optical receiver 6-1 operating at a bit rate of 40 Gbps (abbreviated to be "40 G OR VSR").

The optical receiver (40G OR VSR) 6-1 converts the optical data signals into electrical data signals and outputs 16 parallel data signals each at a bit rate of 2.5 Gbps.

A framer LSI 6-2 transforms the output signals from the optical receiver 6-1 into multiple frames, for example, SONET/SDH (Synchronous Optical NETwork/Synchronous Digital Hierarchy) or OTN (an interface for an optical transmission network recommended by ITU-T G.709). In this process, since overhead is appended to each resulting signal, the framer LSI 6-2 outputs 16 parallel data signals each at a bit rate of 2.7 Gbps as OTN or 2.5 Gbps as SONET/SDH. FIG. 6 illustrates an example of using OTN Framer in the related art. The indicated bit-rate in this figure is in the case of OTN.

A serializer (abbreviated to be SER) 6-3 converts the 16 parallel data signals at a bit rate of 2.7 Gbps as OTN or 2.5 Gbps as SONET/SDH from the framer LSI 6-2 into a serial data signal at a bit rate of 43 Gbps or 40 Gbps, respectively.

A de-multiplexer (DEMUX) 6-4 de-multiplexes the output signals from the serializer (SER) 6-3 at a ratio of 1 to 2, and generates two parallel data signals $I_k$ and $Q_k$ each at a bit rate of 21.5 Gbps as OTN or 20 Gbps as SONET/SDH.

The output signals from the de-multiplexer (DEMUX) 6-4 are input to a DQPSK precoder 6-5, which has the same configuration as described above. The DQPSK precoder 6-5 outputs data signals $\rho_k$ and $\eta_k$ obtained by calculations of the logical relations (2).

The output signals $\rho_k$ and $\eta_k$ are input to a DQPSK optical sender 6-6 (abbreviated to be "40G OS DQPSK"), and the optical sender 6-6 sends optical signals at a bit rate of about 43 Gbps as OTN or 40 Gbps as SONET/SDH to the network.

Meanwhile, the optical signals at 43 or 40 Gbps from the network are received by a DQPSK optical receiver 6-7 (abbreviated to be "40G OS DQPSK"). The DQPSK optical receiver 6-7 outputs data signals $I_k$ and $Q_k$ each at a bit rate of about 21.5 or 20 Gbps.

A multiplexer (MUX) 6-8 multiplexes the data signals $I_k$ and $Q_k$ from the DQPSK optical receiver 6-7 at a ratio of 2 to 1 to convert the data signals $I_k$ and $Q_k$ into a serial data signal at a bit rate of about 43 or 40 Gbps.

The output signals at 43 or 40 Gbps from the multiplexer (MUX) 6-8 are input to a De-serializer (DES) 6-9. The De-serializer (DES) 6-9 converts the serial data signal at 43 or 40 Gbps into 16 parallel data signals each at 2.7 or 2.5 Gbps.

The framer LSI 6-2 extracts and outputs data signals of 16 channels from the OTN or SONET/SDH multi-frame signals each at about 2.5 Gbps.

The 16 parallel data signals at about 2.5 Gbps are sent to an optical sender 6-10 (abbreviated to be "40G OS VSR").

The optical sender (40G OS VSR) 6-10 converts the 16 parallel data signals into a serial data signal at about 40 Gbps, and sends optical signals of the serial data at about 40 Gbps to the client through the optical fiber.

However, during the calculations by the logical circuit including multiple stages as shown in FIG. 4, in the related art, in the DQPSK optical sender used for optical transmission at a bit rate higher than 40 Gbps as described above, it is required that the precoder perform the calculations and output the data signals at a very fast clock speed, specifically, a bit rate of about 20 Gbps, which is comparable to the bit rate of the transmission signals. The DQPSK precoder is not able to perform the logical calculations at a low clock speed.

SUMMARY OF THE INVENTION

Accordingly, it is a general object of the present invention to solve the above problems of the related art.

A more specific object of the present invention is to provide an optical signal transmitter and a transponder operating in a Differential Quadrature Phase Shift Keying (DQPSK) modulation scheme and capable of performing logical calculations at a low clock speed.

According to a first aspect of the present invention, there is provided a signal transmitter capable of modulation by Differential Quadrature Phase-Shift Keying (DQPSK) which transmits a phase-modulated signal generated with a modulation signal so that a signal directly output from a signal receiver corresponding to said signal transmitter is in agreement with a data signal to be transmitted, said signal receiver being capable of modulation by Differential Quadrature Phase-Shift Keying (DQPSK), said modulation signal being precoded by using the data signal to be transmitted and the modulation signal one symbol earlier, said signal transmitter comprising a plurality of precoders that precode the modulation signal by using the data signal to be transmitted and the modulation signal one symbol earlier, said precoders performing logical calculation for precoding in one period simultaneously and in parallel on plural of the transmission data signals extracted sequentially, and performing logical calculation for precoding in a next period simultaneously and in parallel on plural of the transmission data signals extracted sequentially.

Preferably, each of the precoders performs precoding logical calculation for modulation by Differential Quadrature Phase-Shift Keying (DQPSK) for optical transmission at a high bit rate.

Preferably, the precoders and a framer for converting the transmission data signals into multiple frames are integrated as an LSI (Large Scale Integrated circuit).

According to a second aspect of the present invention, there is provided a transponder capable of modulation by Differential Quadrature Phase-Shift Keying (DQPSK) which transmits a n-phase-modulated signal generated with a modulation signal so that a signal directly output from a signal receiver corresponding to said transponder is in agreement with a data signal to be transmitted, said signal receiver being capable of modulation by Differential Quadrature Phase-Shift Keying (DQPSK), said modulation signal being precoded by using the data signal to be transmitted and the modulation signal one symbol earlier, said transponder comprising a plurality of precoders that precode the modulation signal by using the data signal to be transmitted and the modulation signal one symbol earlier, said precoders performing logical calculation for preceding in one period simultaneously and in parallel on plural of the transmission data signals extracted sequentially, and performing logical calculation for precoding in a next period simultaneously and in parallel on plural of the transmission data signals extracted sequentially.

Preferably, each of the precoders performs preceding logical calculation for modulation by Differential Quadrature Phase-Shift Keying (DQPSK) for optical transmission at a high bit rate.

Preferably, the precoders and a framer for converting the transmission data signals into multiple frames are integrated as an LSI (Large Scale Integrated circuit).

According to the present invention, because plural precoders are provided to perform preceding logical calculation in parallel, each precoder is capable of performing the logical calculation at a low speed. As a result, a high speed logical circuit for the precoder is not required, and the precoder can be formed by low speed, inexpensive and stable circuits. This is especially desirable for a precoder operating with the Differential Quadrature Phase-Shift Keying (DQPSK) modulation scheme for optical transmission at a high bit rate.

In addition, because each precoder is capable of performing the logical calculation at a low speed, if the precoders and a framer LSI for multiplexing transmission data signals for multiplexing transmission are integrated as an LSI (Large Scale Integrated circuit), the DQPSK transmitter can be constructed at low cost.

These and other objects, features, and advantages of the present invention will be more apparent from the following detailed description of the preferred embodiments given with reference to the accompanying drawings.

DESCRIPTION OF THE PREFERRED EMBODIMENTS

Below, preferred embodiments of the present invention are explained with reference to the accompanying drawings.

Figure 1:
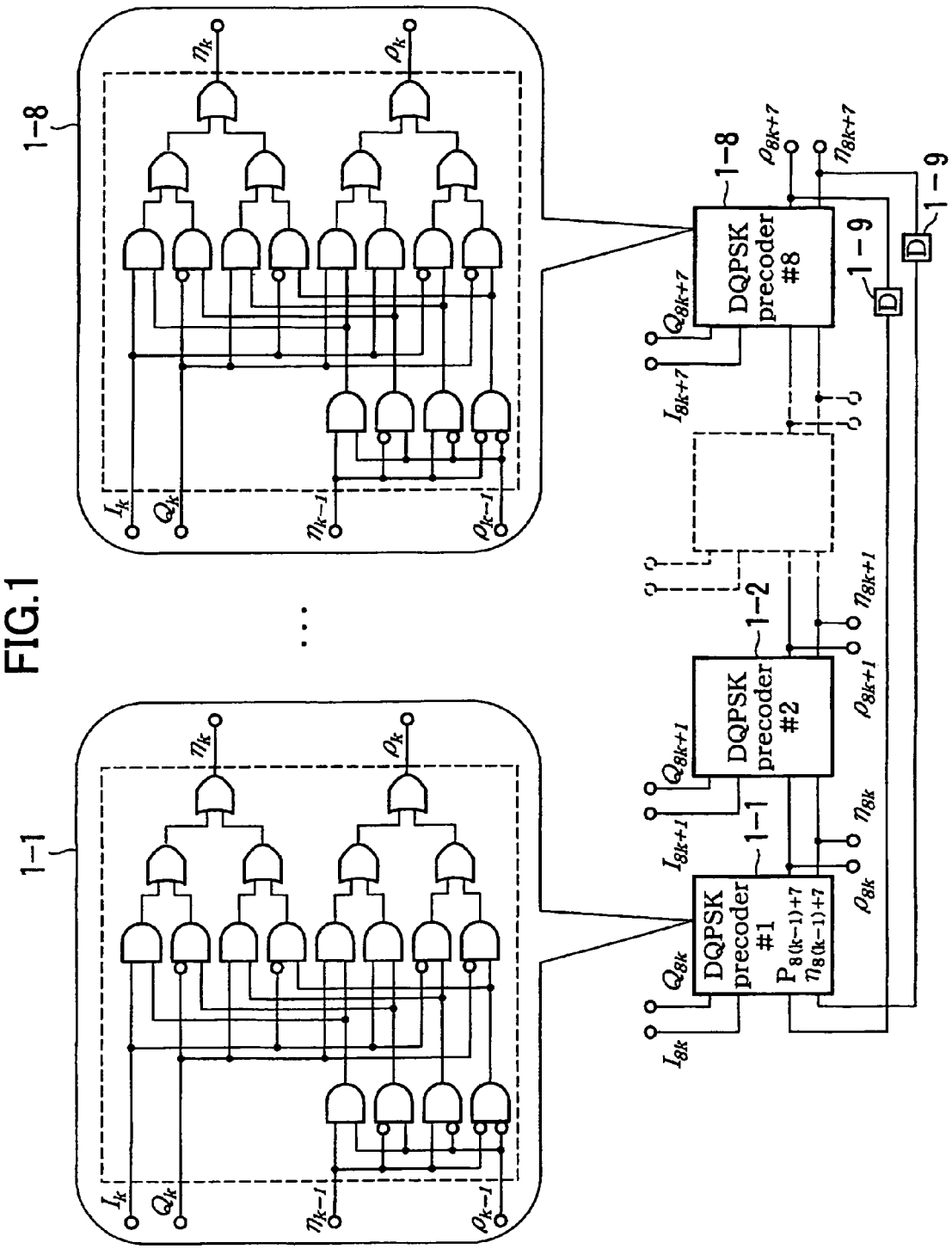
FIG. 1 is a block diagram illustrating an example of a configuration of a precoder according to an embodiment of the present invention.

FIG. 1 is a block diagram illustrating an example of a configuration of a precoder according to an embodiment of the present invention.

In FIG. 1, there are eight aforesaid precoders arranged in parallel, and each of precoders is able to perform calculation of the logical relations (2), as described above.

The eight precoders perform the logical calculation of the logical relations (2) in one period simultaneously and in parallel on eight symbols (data signals) extracted sequentially, and perform the logical calculation in a next period on the next eight symbols (data signals) simultaneously and in parallel. This procedure is repeatedly executed.

Specifically, as illustrated in FIG. 1, there are provided a first precoder 1-1 for performing logical calculation on 8k-th data signals $I_{8k}$ and $Q_{8k}$, a second precoder 1-2 for performing logical calculation on (8k+1)-th data signals $I_{8k+1}$ and $Q_{8k+1}$, a third precoder 1-3 (not illustrated) for performing logical calculation on (8k+2)-th data signals $I_{8k+2}$ and $Q_{8k+2}$, a fourth precoder 1-4 (not illustrated) for performing logical calculation on (8k+3)-th data signals $I_{8k+3}$ and $Q_{8k+3}$, a fifth precoder 1-5 (not illustrated) for performing logical calculation on (8k+4)-th data signals $I_{8k+4}$ and $Q_{8k+4}$, a sixth precoder 1-6 (not illustrated) for performing logical calculation on (8k+5)-th data signals $I_{8k+5}$ and $Q_{8k+5}$, a seventh precoder 1-7 (not illustrated) for performing logical calculation on (8k+6)-th data signals $I_{8k+6}$ and $Q_{8k+6}$, and an eighth precoder 1-8 for performing logical calculation on (8k+7)-th data signals $I_{8k+7}$ and $Q_{8k+7}$.

The calculation results of each precoder are output as DQPSK modulation signals.

Then, the calculation results $\rho_{8k}$ and $\eta_{8k}$ from the first precoder 1-1 are input to the second precoder 1-2, the calculation results $\rho_{8k+1}$ and $\eta_{8k+1}$ from the second precoder 1-2 are input to the third precoder 1-3, the calculation results $\rho_{8k+2}$ and $\eta_{8k+2}$ from the third precoder 1-3 are input to the fourth precoder 1-4, the calculation results $\rho_{8k+3}$ and $\eta_{8k+3}$ from the fourth precoder 1-4 are input to the fifth precoder 1-5, the calculation results $\rho_{8k+4}$ and $\eta_{8k+4}$ from the fifth precoder 1-5 are input to the sixth precoder 1-6, the calculation results $\rho_{8k+5}$ and $\eta_{8k+5}$ from the sixth precoder 1-6 are input to the seventh precoder 1-7, the calculation results $\rho_{8k+6}$ and $\eta_{8k+6}$ from the seventh precoder 1-7 are input to the eighth precoder 1-8, and the calculation results $\rho_{8k+7}$ and $\eta_{8k+7}$ from the eighth precoder 1-8 are input to the first precoder 1-1 in the next calculation period through a holding circuit as a delay element 1-9.

The precoders 1-1 through 1-8 perform calculations that can be expressed by the following logical relations (3).

$$\begin{aligned}
\rho_{8k} &= Q_{8k}\rho_{8k-1}\eta_{8k-1} + I_{8k}\rho_{8k-1}\overline{\eta_{8k-1}} + \overline{I_{8k}\rho_{8k-1}}\eta_{8k-1} + \overline{Q_{8k}\rho_{8k-1}\eta_{8k-1}} \\
\rho_{8k+1} &= Q_{8k+1}\rho_{8k}\eta_{8k} + I_{8k+1}\rho_{8k}\overline{\eta_{8k}} + \overline{I_{8k+1}\rho_{8k}}\eta_{8k} + \overline{Q_{8k+1}\rho_{8k}\eta_{8k}} \\
&\vdots \\
\rho_{8k+7} &= Q_{8k+7}\rho_{8k+6}\eta_{8k+6} + I_{8k+7}\rho_{8k+6}\overline{\eta_{8k+6}} + \overline{I_{8k+7}\rho_{8k+6}}\eta_{8k+6} + \overline{Q_{8k+7}\rho_{8k+6}\eta_{8k+6}} \\
\eta_{8k} &= I_{8k}\rho_{8k-1}\eta_{8k-1} + \overline{Q_{8k}}\rho_{8k-1}\overline{\eta_{8k-1}} + Q_{8k}\overline{\rho_{8k-1}}\eta_{8k-1} + \overline{I_{8k}}\rho_{8k-1}\eta_{8k-1} \\
\eta_{8k+1} &= I_{8k+1}\rho_{8k}\eta_{8k} + \overline{Q_{8k+1}}\rho_{8k}\overline{\eta_{8k}} + Q_{8k+1}\overline{\rho_{8k}}\eta_{8k} + \overline{I_{8k+1}}\rho_{8k}\eta_{8k} \\
&\vdots \\
\eta_{8k+7} &= I_{8k+7}\rho_{8k+6}\eta_{8k+6} + \overline{Q_{8k+7}}\rho_{8k+6}\overline{\eta_{8k+6}} + Q_{8k+7}\overline{\rho_{8k+6}}\eta_{8k+6} + \overline{I_{8k+7}}\rho_{8k+6}\eta_{8k+6}
\end{aligned} \quad (3)$$

In this way, because plural precoders are provided in parallel to perform precoding logical calculation simultaneously and in parallel on plural data signals, each precoder is able to operate at a low clock speed. For example, a precoder of the related art operating at about 20 Gbps can be replaced by eight precoders each operating at about 2.5 Gbps (=20/8).

It is certain that in the present invention, the number of the precoders is not limited to eight, but can be any integer.

Figure 2:
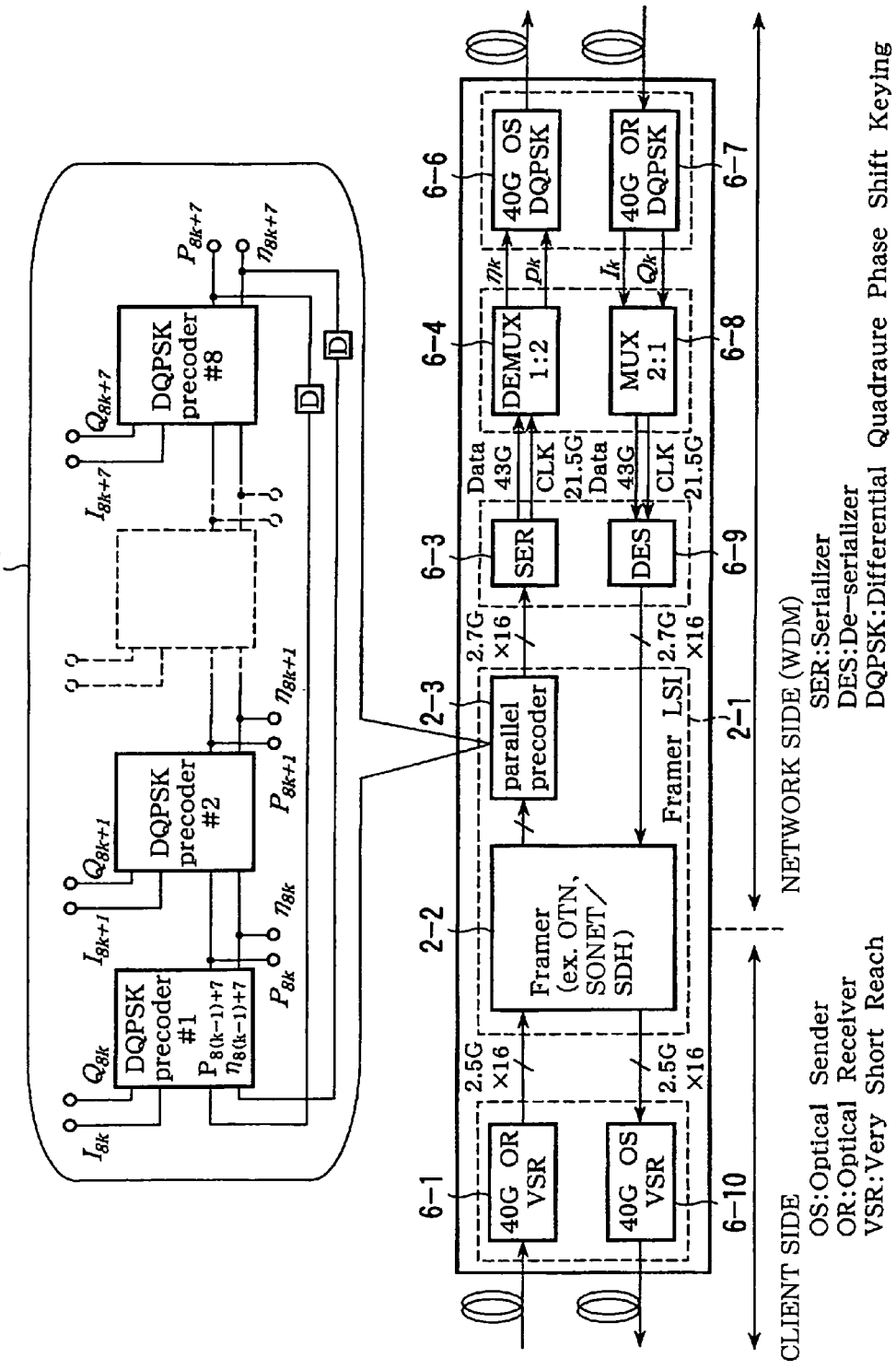
FIG. 2 is block diagram illustrating an example of a DQPSK transponder according to an embodiment of the present invention using the precoder in FIG. 1.
Figure 3:
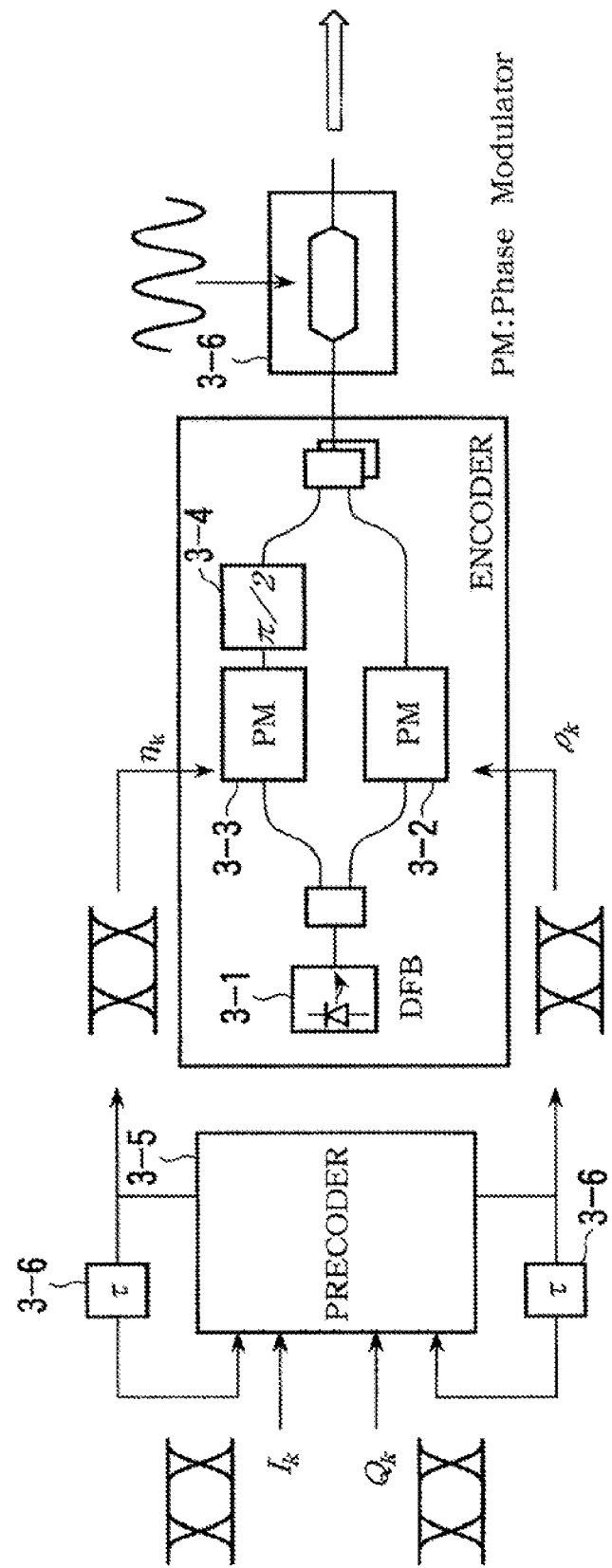
FIG. 3 is a block diagram illustrating an example of a configuration of an optical sender employing the DQPSK modulation scheme in the related art.
Figure 4:
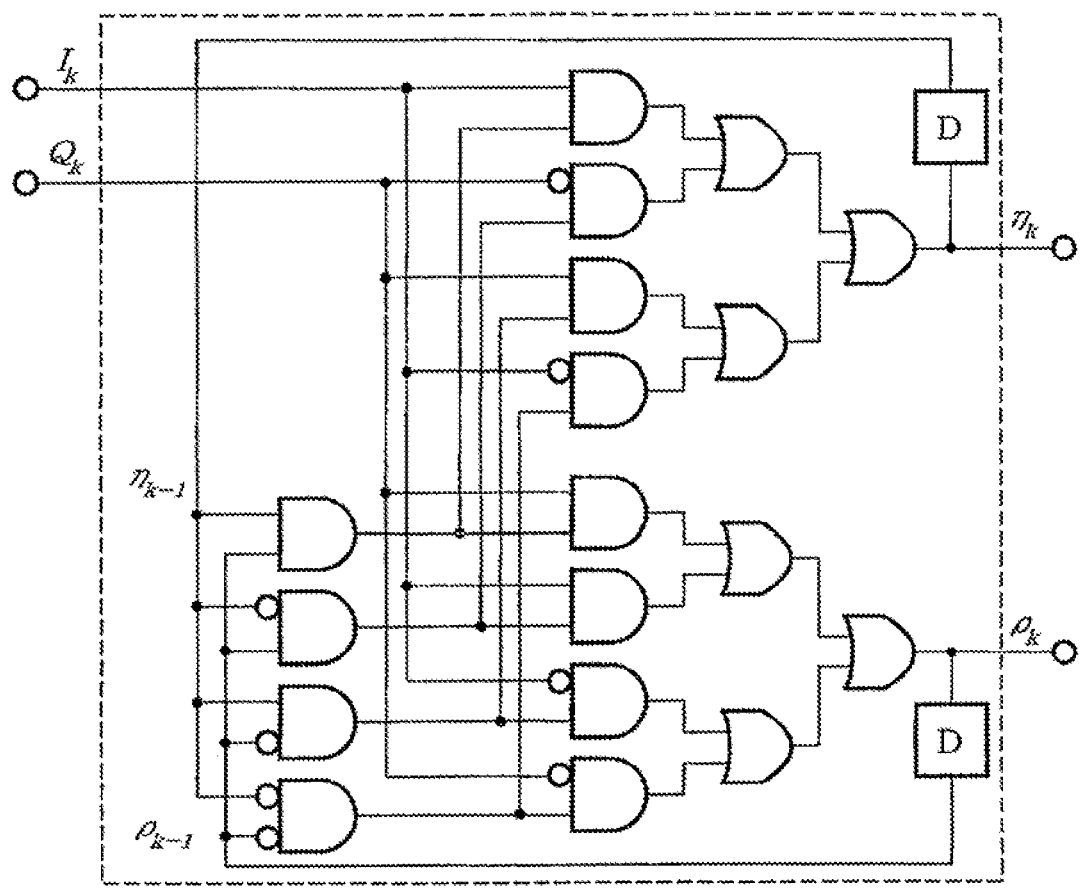
FIG. 4 is a circuit diagram illustrating an example of a configuration of the precoder in the related art.
Figure 5:
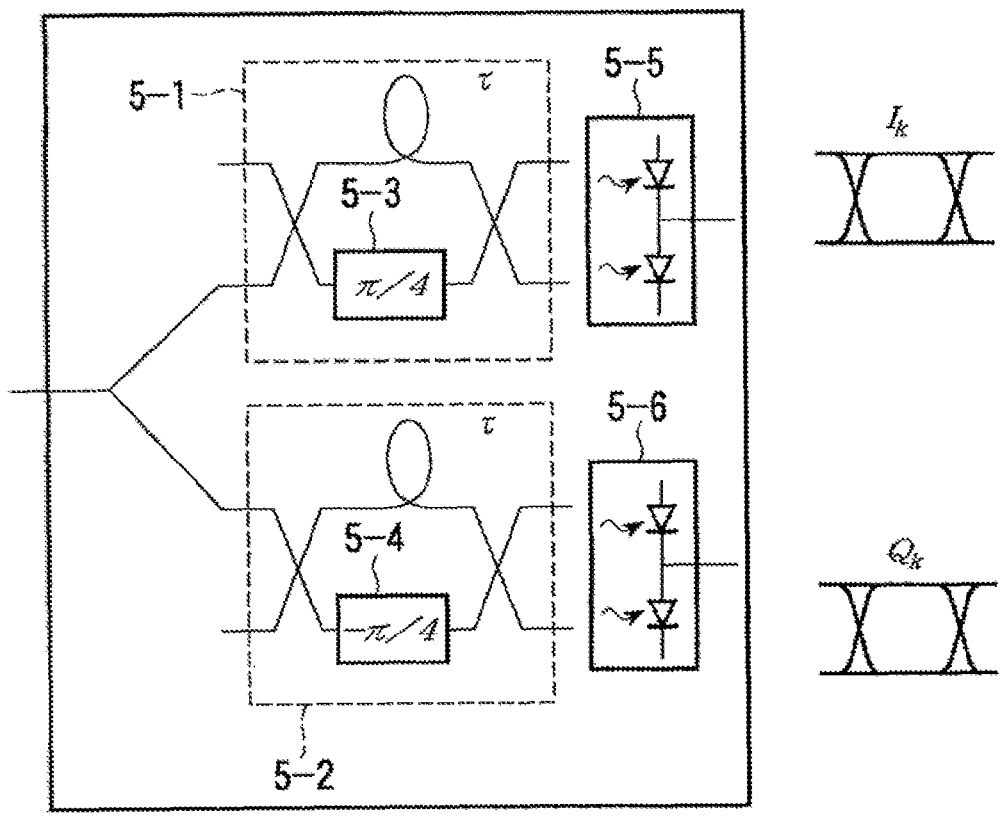
FIG. 5 is a block diagram illustrating an example of a configuration of an optical receiver for demodulating the DQPSK optical signals in the related art.

FIG. 2 is block diagram illustrating an example of a DQPSK transponder according to an embodiment of the present invention using the precoder in FIG. 1.

Figure 6:
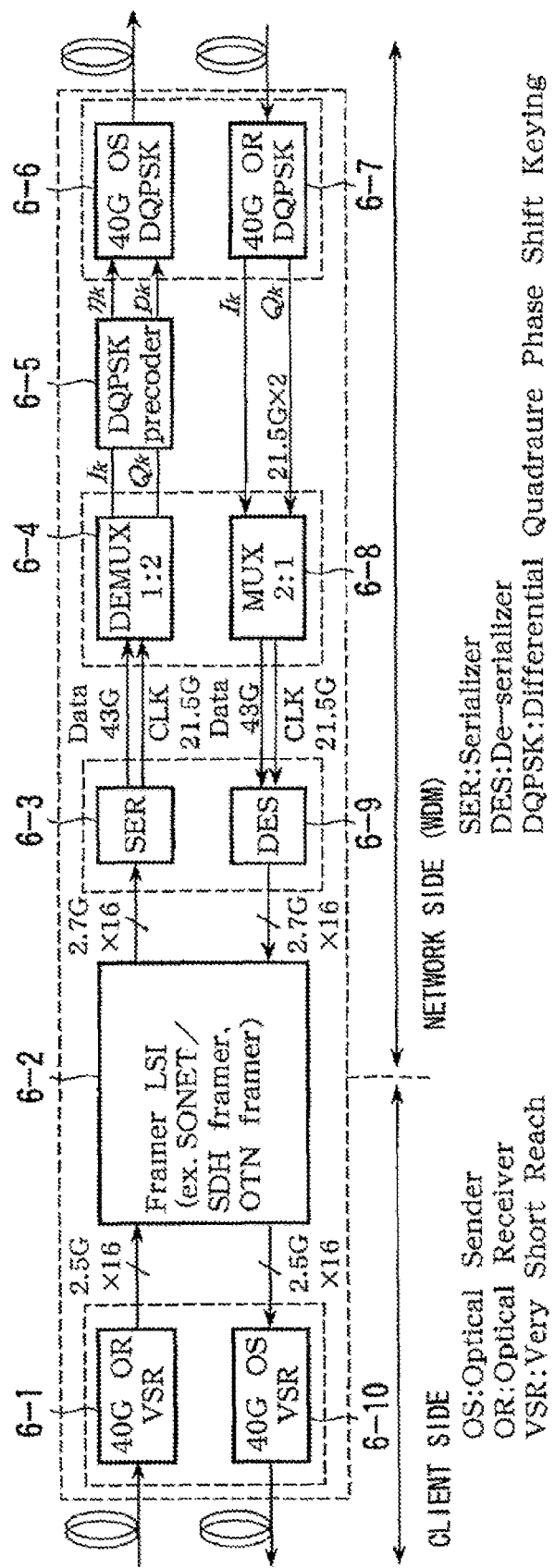
FIG. 6 is block diagram illustrating an example of a DQPSK transponder in the related art using the optical sender in FIG. 4 and the above optical receiver in FIG. 5.

Instead of the DQPSK precoder 6-5 prior to the DQPSK optical sender (40G OS DQPSK) 6-6 in FIG. 6, in the DQPSK transponder according to the present invention, as illustrated in FIG. 2, a parallel precoder 2-3 is provided in a framer LSI 2-1, for example, after a framer 2-2. In addition, for example, the parallel precoder 2-3 and the framer 2-2 are integrated together as an LSI (Large Scale Integrated circuit).

The parallel precoder 2-3 in FIG. 2 corresponds to the precoder structure including eight precoders in FIG. 1. Other elements in FIG. 2 are the same as those in FIG. 6, and the same reference numbers are used.

As described above, because plural precoders are provided in parallel to perform preceding logical calculation simultaneously and in parallel on plural data signals, each precoder is able to operate at a low clock speed. For example, a precoder of the related art operating at about 20 Gbps can be replaced by eight precoders each operating at about 2.5 Gbps (=20/8). Therefore, the eight precoders can be operated with a conventional framer LSI, which operates at about 2.5 Gbps, and it is possible to integrate the precoders and the framer LSI together as an LSI. It is certain that the number of the precoders is not limited to eight, but can be any integer.

While the invention has been described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese priority patent application No. 2005-054372 filed on Feb. 28, 2005, the entire contents of which are hereby incorporated by reference.

What is claimed is:

1. A signal transmitter capable of modulation by Differential Quadrature Phase-Shift Keying which transmits a phase-modulated signal generated with a modulation signal so that a signal directly output from a signal receiver corresponding to said signal transmitter is in agreement with a data signal to be transmitted, said signal receiver being capable of modulation by Differential Quadrature Phase-Shift Keying, said modulation signal being precoded by using the data signal to be transmitted and the modulation signal that is one symbol earlier, said signal transmitter comprising:

first through Nth precoders configured to precode the modulation signal by using the data signal to be transmitted and the modulation signal that is one symbol earlier, said first through Nth precoders performing logical calculations for precoding, simultaneously and in parallel in one period, a set of transmission data signals that are extracted sequentially from the data signal to be transmitted, and performing logical calculations for precoding, simultaneously and in parallel in a next period, another set of transmission data signals that are extracted sequentially from the data signal to be transmitted, where N is a natural number greater than or equal to two; and a delay element part having a delay time amounting to one symbol, wherein an output of an ith precoder is input to an (i+1)th precoder, i=1, . . . , N−1, and an output of the Nth precoder is input to an input of the first precoder via said delay element part.

2. The signal transmitter as claimed in claim 1, wherein each of the first through Nth precoders performs a precoding logical calculation for modulation by Differential Quadrature Phase-Shift Keying for optical transmission at a bit rate of 40 Gb/s or higher.

3. The signal transmitter as claimed in claim 1, further comprising:

a framer configured to convert the transmission data signals into multiple frames, wherein the first through Nth precoders and the framer are integrated as a Large Scale Integrated circuit.

4. A transponder capable of modulation by Differential Quadrature Phase-Shift Keying which transmits a phase-modulated signal generated with a modulation signal so that a signal directly output from a signal receiver corresponding to said transponder is in agreement with a data signal to be transmitted, said signal receiver being capable of modulation by Differential Quadrature Phase-Shift Keying, said modulation signal being precoded by using the data signal to be transmitted and the modulation signal that is one symbol earlier, said transponder comprising:

first through Nth precoders configured to precode the modulation signal by using the data signal to be transmitted and the modulation signal that is one symbol earlier, said first through Nth precoders performing logical calculations for precoding, simultaneously and in parallel in one period, a set of transmission data signals that are extracted sequentially from the data signal to be transmitted, and performing logical calculations for precoding, simultaneously and in parallel in a next period, another set of transmission data signals that are extracted sequentially from the data signal to be transmitted, where N is a natural number greater than or equal to two; and a delay element part having a delay time amounting to one symbol, wherein an output of an ith precoder is input to an (i+1)th precoder, i=1, . . . , N−1, and an output of the Nth precoder is input to an input of the first precoder via said delay element part.

5. The transponder as claimed in claim 4, wherein each of the precoders performs a precoding logical calculation for modulation by Differential Quadrature Phase-Shift Keying for optical transmission at a bit rate of 40 Gb/s or higher.

6. The transponder as claimed in claim 4, further comprising:

a framer configured to convert the transmission data signals into multiple frames, wherein the first through Nth precoders and the framer are integrated as a Large Scale Integrated circuit.

* * * * *